United States Patent
Zhang et al.

(10) Patent No.: US 11,480,805 B2
(45) Date of Patent: Oct. 25, 2022

(54) BIDIRECTIONAL MICRO-OPTICS MODULE FOR WDM APPLICATION

(71) Applicants: Qingming Zhang, Shenzhen (CN); Jinghui Li, Sierra Madre, CA (US); Shouli Tang, Shenzhen (CN); Xiaodong Huang, Shenzhen (CN); Wen Lu, Shenzhen (CN); Yaozhong Lin, Shenzhen (CN)

(72) Inventors: Qingming Zhang, Shenzhen (CN); Jinghui Li, Sierra Madre, CA (US); Shouli Tang, Shenzhen (CN); Xiaodong Huang, Shenzhen (CN); Wen Lu, Shenzhen (CN); Yaozhong Lin, Shenzhen (CN)

(73) Assignee: Auxora (Shenzhen) Inc, Shenzhen (CN)

( * ) Notice: Subject to any disclaimer, the term of this patent is extended or adjusted under 35 U.S.C. 154(b) by 48 days.

(21) Appl. No.: 16/894,062

(22) Filed: Jun. 5, 2020

(65) Prior Publication Data
US 2021/0318549 A1 Oct. 14, 2021

(30) Foreign Application Priority Data
Apr. 8, 2020 (CN) .......................... 202010267652.7

(51) Int. Cl.
*G02B 27/10* (2006.01)
*H04J 14/02* (2006.01)
*G02B 27/14* (2006.01)

(52) U.S. Cl.
CPC ......... *G02B 27/1006* (2013.01); *G02B 27/14* (2013.01); *H04J 14/0216* (2013.01)

(58) Field of Classification Search
CPC .... G02B 27/1006; G02B 27/10; G02B 27/14; G02B 6/29362; G02B 6/4214; G02B 6/4215; G02B 6/2426; H04J 14/0216; H04J 14/02
See application file for complete search history.

(56) References Cited

U.S. PATENT DOCUMENTS
9,229,167 B2 * 1/2016 Chang .................. G02B 27/123

FOREIGN PATENT DOCUMENTS
CN 110058362 A * 7/2019 ........... G02B 6/4214

* cited by examiner

*Primary Examiner* — Ryan D Howard (57) ABSTRACT

Embodiment of present invention provide a micro-optics module. The module includes a glass body of pentagon shape having five side surfaces including an upper side surface, a left side and a right side surface next to the upper side surface, a lower side surface next to the left side surface, and a 5th side surface next to and between the lower side surface and the right side surface. The glass body is adapted to, upon incident of a first optical signal at the left side surface, cause the first optical signal to propagate toward and exit the glass body at the right side surface and, upon incident of a second optical signal at the right side surface, cause the second optical signal to reflect back at the left side surface; reflect back at the 5th side surface; and finally exit the glass body at the upper side surface.

17 Claims, 5 Drawing Sheets

Figure 5

BIDIRECTIONAL MICRO-OPTICS MODULE FOR WDM APPLICATION

CROSS REFERENCE TO RELATED APPLICATION

The present application claims benefit of priority to a Chinese patent application S/N: 202010267652.7, filed Apr. 8, 2020 with the China National Intellectual Property Administration, the content of which is incorporated herein by reference in its entirety.

FIELD OF THE INVENTION

The present application relates generally to integrated optical devices, and more particularly to a micro-optics module for WDM (wavelength-division-multiplexing) application and method of making the same.

BACKGROUND

Optical communication plays an important role in supporting high speed data connection in the field of telecom, datacom, data center, cable TV, medical image transmission, video signal transmission in flights, boats, and cars, to name a few. Optical communication uses high speed transmitters that may include, for example, DFB (distributed feedback) lasers and VCSEL (vertical cavity surface emitting lasers) and high speed receivers that may include, for example, PIN (p-i-n junction photo-diode) and APD (avalanche photo-diode), to increase the speed of transmitting and receiving of optical signals.

To further increase the speed of data connection, recent optical communication employs WDM technology to combine several wavelengths (colors) of optical signals, often modulated signals from multiple transmitters, together for transmission and, at the receiving side, divide them among different receivers, thereby doubling, tripling, or multiplying (in high multiples) the rate of data connection depending on the number of wavelengths being deployed. There are various WDM devices, such as WDM filters and combiners, that are vital components in enabling this WDM technology cost effectively.

Figure 1:
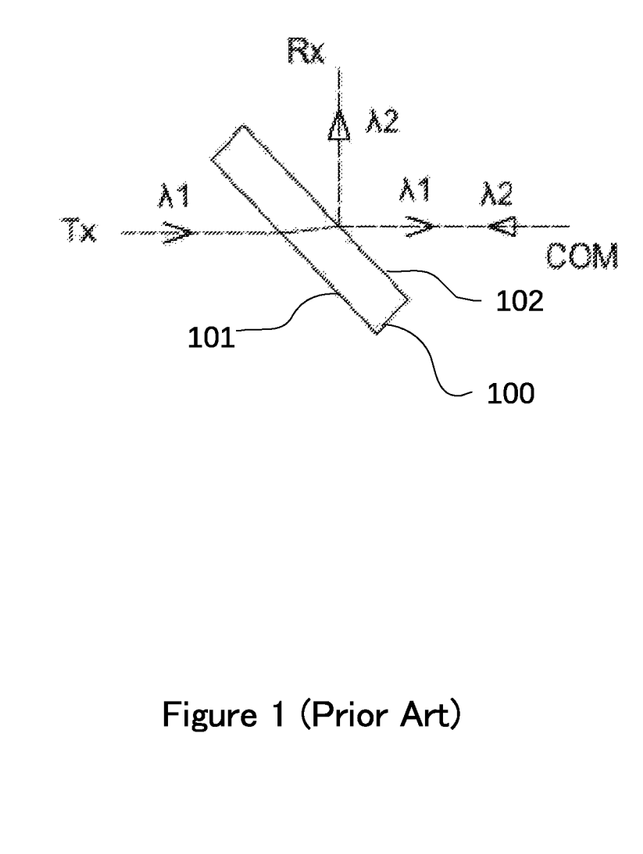
FIG. 1 is a simplified illustration of a WDM device as is currently known in the art.

FIG. 1 is a simplified illustration of a WDM device as is currently known in the art. Transmitting and receiving optical signals are multiplexed and/or de-multiplexed through the use of a piece of WDM filter 100. More specifically, as being illustrated in FIG. 1, WDM filter 100 has a first surface 101 that is often coated with an anti-reflective (AR) coating (or film) and a second surface 102 that is coated with a WDM coating (or film). WDM filter 100 is generally placed, with respect to its first and second surfaces 101 and 102 that are parallel to each other, in a 45-degree angle relative to the direction of out-going transmitting optical signal of wavelength λ1 (Lambda 1) and in-coming receiving optical signal of wavelength λ2 (Lambda 2). The WDM coating at second surface 102 is made such that it ensures that only a specific wavelength, such as λ1 of the transmitting optical signal from Tx, may pass through the second surface 102, and λ2 of the receiving optical signal may get reflected at the second surface 102, in a 90-degree angle, to propagate toward a receiver Rx that is placed above the WDM filter 100.

With the increasingly narrowing gap between center wavelengths of the transmitting and receiving optical signals such as λ1 and λ2, high-precision control of the applying of WDM coating on the second surface 102 of WDM filter 100 becomes vitally important. In addition, the orientation of WDM filter 100, placed precisely at a 45-degree angle to the receiving optical signal with a range of tolerance less than 0.1 degree, becomes critical in order to meet operational requirement. These stringent requirements have so far resulted in high manufacturing cost and low yield of modules that may be qualified for use as WDM filter 100 in deployment.

Figure 2A:
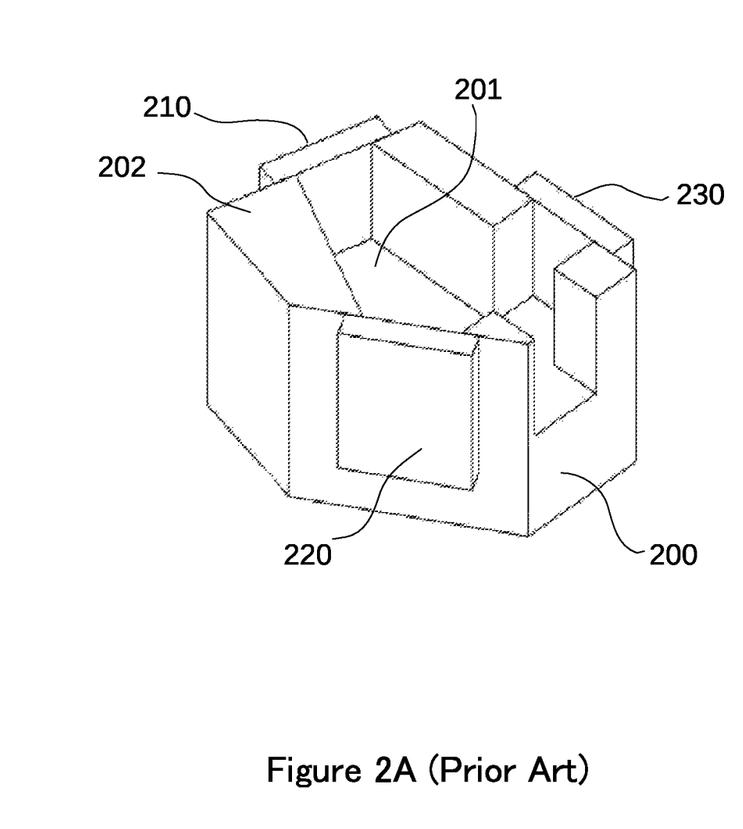
FIG. 2A and FIG. 2B are simplified illustrations of a perspective view and a top view of another WDM device as is currently known in the art.
Figure 2B:
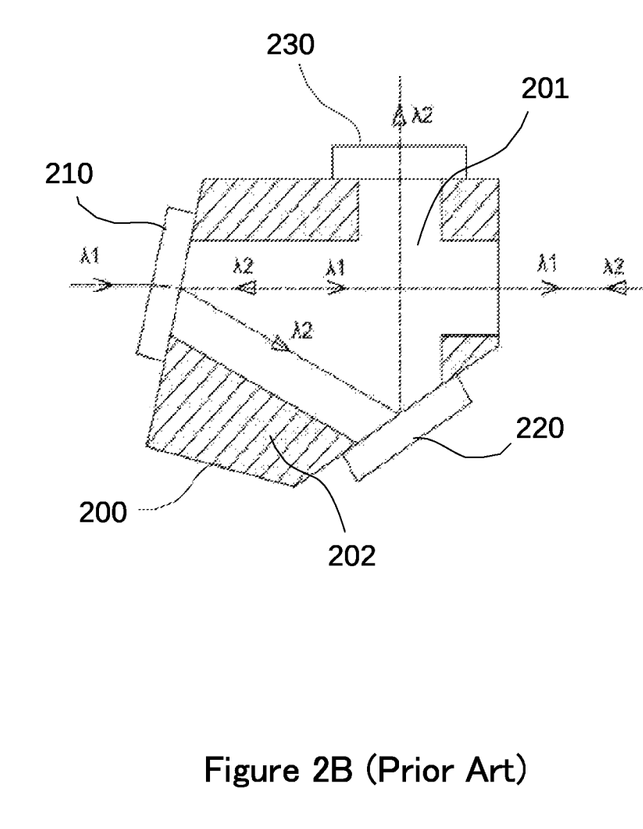

FIG. 2A and FIG. 2B are simplified illustrations of a perspective view and top view of another WDM device as is currently known in the art. WDM device 200 may be embodied in a metal structure 202 that is machined to have three channels, e.g., a horizontal channel, a vertical channel, and a slant channel. As being illustrated in FIG. 2A, the channels create a set of open spaces that facilitate the propagation of optical signals inside metal structure 202. For example, as being illustrated in FIG. 2B, the horizontal channel allows a transmitting optical signal of wavelength λ1 to propagate from left to right and exit metal structure 202, and in the meantime allows a receiving optical signal of wavelength λ2 to propagate from right to left to reach a WDM filter 210. The receiving optical signal then gets reflected at WDM filter 210. The slant channel allows the optical signal of wavelength λ2 reflected at WDM filter 210 to propagate toward and subsequently get reflected at a mirror 220. The vertical channel allows the optical signal of wavelength λ2 reflected at mirror 220 to propagate upward and exit metal structure 202 via a WDM filter 230.

WDM filters 210 and 230 and mirror 220 are attached to metal structure 202 at the end of the respective channels that they cover. During manufacturing, WDM filters 210 and 230 and mirror 220 may need to be made sufficiently big, at least larger than the cross-sectional areas of the horizontal, slant and vertical channels, such that they may be attached or glued to areas of metal structure 202 that surrounds the channels. This consequently results in wasteful loss of precious raw materials that may otherwise be used for making more WDM filters and mirrors. In addition, as being made out of metal, material property such as thermal expansion coefficient of structure 202 may be quite different from those materials that are used for WDM filters 210 and 230 and mirror 220, careful design and thermal balancing may be needed when WDM filters and mirror are attached to metal structure 202 for durability concern. It has become obvious that WDM device 200 is not positioned for mass production.

SUMMARY

A micro-optics module for WDM (wavelength-division-multiplexing) application is provided. The module includes a glass body of pentagon shape, when viewed from a top thereof, having five side surfaces including an upper side surface, a left side and a right side surface next to the upper side surface, a lower side surface next to the left side surface, and a 5th side surface next to and between the lower side surface and the right side surface.

In one embodiment, the glass body is adapted to, upon incident of a first optical signal at the left side surface, cause the first optical signal to propagate directly toward and exit the glass body subsequently at the right side surface and, upon incident of a second optical signal at the right side surface, cause the second optical signal to propagate toward the left side surface; to reflect back at the left side surface to propagate toward the 5th side surface; to reflect back at the 5th side surface to propagate toward the upper side surface; and to exit the glass body subsequently at the upper side surface.

In another embodiment, the module further includes a transmit (Tx) filter being attached to the left side surface of the glass body, wherein the Tx filter enables the first optical signal of a first wavelength λ1 to pass through the Tx filter and enter the glass body.

In one embodiment, the module includes an anti-reflective (AR) coating on the right side surface of the glass body, wherein the AR coating enables the second optical signal to enter the glass body and propagate toward the left side surface, and the Tx filter causes the second optical signal of a second wavelength λ2 to reflect back at the left side surface to propagate toward the 5th side surface. In one embodiment, λ1 and λ2 are separated no more than 60 nm.

In another embodiment, the module includes a reflective mirror being attached to the 5th side surface of the glass body that causes the second optical signal to reflect back at the 5th side surface to propagate toward the upper side surface; and further comprising a receive (Rx) filter being attached to the upper side surface of the glass body that enables the second optical signal of the second wavelength λ2 to pass through and exit the glass body.

According to one embodiment, the module includes a substrate thereupon the glass body situates and is attached, wherein the substrate includes sidewalls forming a perimeter that, when viewed from a top thereof and from the top of the glass body, encompasses the glass body; and the perimeter includes an upper sidewall that forms an angle e of at least 2 degrees with the upper side surface of the glass body.

In one embodiment, the perimeter of the substrate includes a left sidewall that forms an angle d of no more than 13.5 degrees with the left side surface of the glass body. In another embodiment, the left side surface and the 5th side surface of the glass body form an angle β that equals to (45−e) degrees. In yet another embodiment, the left side surface and the right side surface of the glass body are parallel to each other, and where the right side surface and the upper side surface of the glass body form an angle α that equals to (90−d+e).

According to one embodiment, the glass body has a thickness of about 0.95 mm, and wherein the Tx filter, the Rx filter, and the reflective mirror have a height of about 0.95 mm, measured in a direction of thickness of the glass body, that is substantially same as the thickness of the glass body. According to another embodiment, the Tx filter, the Rx filter, and the reflective mirror have a length that is substantially same as the height thereof about 0.95 mm, measured in a direction perpendicular to the height along surfaces of the glass body to which the Tx filter, the Rx filter and the reflective mirror are attached respectively.

In one embodiment, a center wavelength of the Tx filter is one of around 1309.14 nm and around 1295.56 nm, and a center wavelength of the Rx filter is another one of around 1309.14 nm and around 1295.56 nm that is different from that of the Tx filter, and the module has an insertion loss of no more than 0.5 dB in a bandwidth of around 2.1 nm centered around their respective center wavelengths. In another embodiment, a center wavelength of the Tx filter is one of around 1330.00 nm and around 1270.00 nm, and a center wavelength of the Rx filter is another one of around 1330.00 nm and around 1270.00 nm that is different from that of the Tx filter, and the module has an insertion loss of no more than 0.5 dB in a bandwidth of around 13.0 nm centered around their respective center wavelengths.

In one embodiment, the Tx filter and Rx filter have a first and a second surfaces respectively, and include an AR coating on the first surfaces and a WDM filtering coating on the second surfaces, wherein the AR coating has a reflectivity of less than 0.25% over a wavelength ranging from about 1260 nm to about 1360 nm. In another embodiment, the reflective mirror includes a first surface with a high reflective coating having a reflectivity larger than 99.80% over a wavelength ranging from about 1260 nm to about 1360 nm, and includes a second surface of matte condition.

BRIEF DESCRIPTION OF THE DRAWINGS

The present invention will be understood and appreciated more fully from the following detailed description of embodiment of the invention, taken in conjunction with accompanying drawings of which.

It will be appreciated that for simplicity and clarity purpose, elements shown in the drawings have not necessarily been drawn to scale. Further, in various functional block diagrams, two connected devices and/or elements may not necessarily be illustrated to be connected. In some other instances, grouping of certain elements in a functional block diagram may be solely for the purpose of description and may not necessarily imply that they are in a single physical entity or they are embodied in a single physical entity.

DETAILED DESCRIPTION OF PREFERRED EMBODIMENT

In order to rapidly deploy WDM technology that is used to combine (multiplex) multiple optical signals of different wavelengths into a single WDM stream at a transmitting side and divide (de-multiplex) the single WDM stream into multiple optical signals at a receiving side, there is an urgent need to develop a cost effective way of manufacturing WDM devices, in particular WDM filtering modules for current 5G network application, that are vital to this WDM technology. Embodiment of present invention provide a compact structure of integrated WDM device or micro-optics module, and a method of making the same with improved efficiency.

Figure 3:
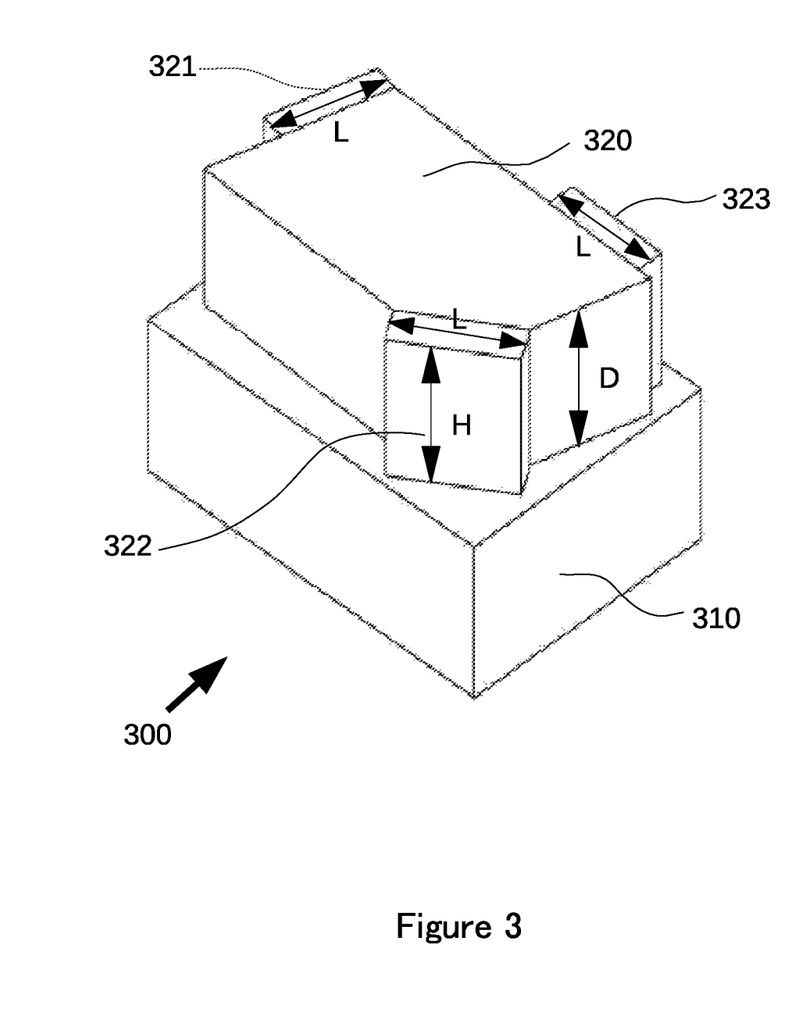
FIG. 3 is a demonstrative illustration of perspective view of a micro-optics module for WDM application according to an embodiment of present invention.

FIG. 3 is a demonstrative illustration of a perspective view of a micro-optics module 300 for WDM application according to one embodiment of present invention. More specifically, as being illustrated in FIG. 3, micro-optics module 300 may include a glass body 320 that sits on top of and is attached to a substrate 310. When being viewed from a top thereof, glass body 320 may possess a pentagon shape having five side surfaces, whose details are described below in connection with reference to FIG. 4. Additionally as is illustrated in FIG. 3, a transmit (Tx) filter 321, a receive (Rx) filter 323, and a reflective mirror 322 are attached to three of the five side surfaces respectively.

According to one embodiment, glass body 320 may preferably have a thickness D of about 0.95 mm, and Tx filter 321, Rx filter 323, and reflective mirror 322 may have a height H of about 0.95 mm as well, measured in a same direction as thickness of glass body 320 as being illustrated in FIG. 3. In other words, height H of Tx filter 321, Rx filter 323, and reflective mirror 322 may be substantially same as thickness D of glass body 320. According to another embodiment, Tx filter 321, Rx filter 323, and reflective mirror 322 may have a length L that is substantially same as their height H of about 0.95 mm, which is measured in a direction perpendicular to height H and along side surfaces of glass body 320 to which they respectively attached. However, embodiment of present invention are limited in this aspect and other dimensions of glass body may be used as well.

Figure 4:
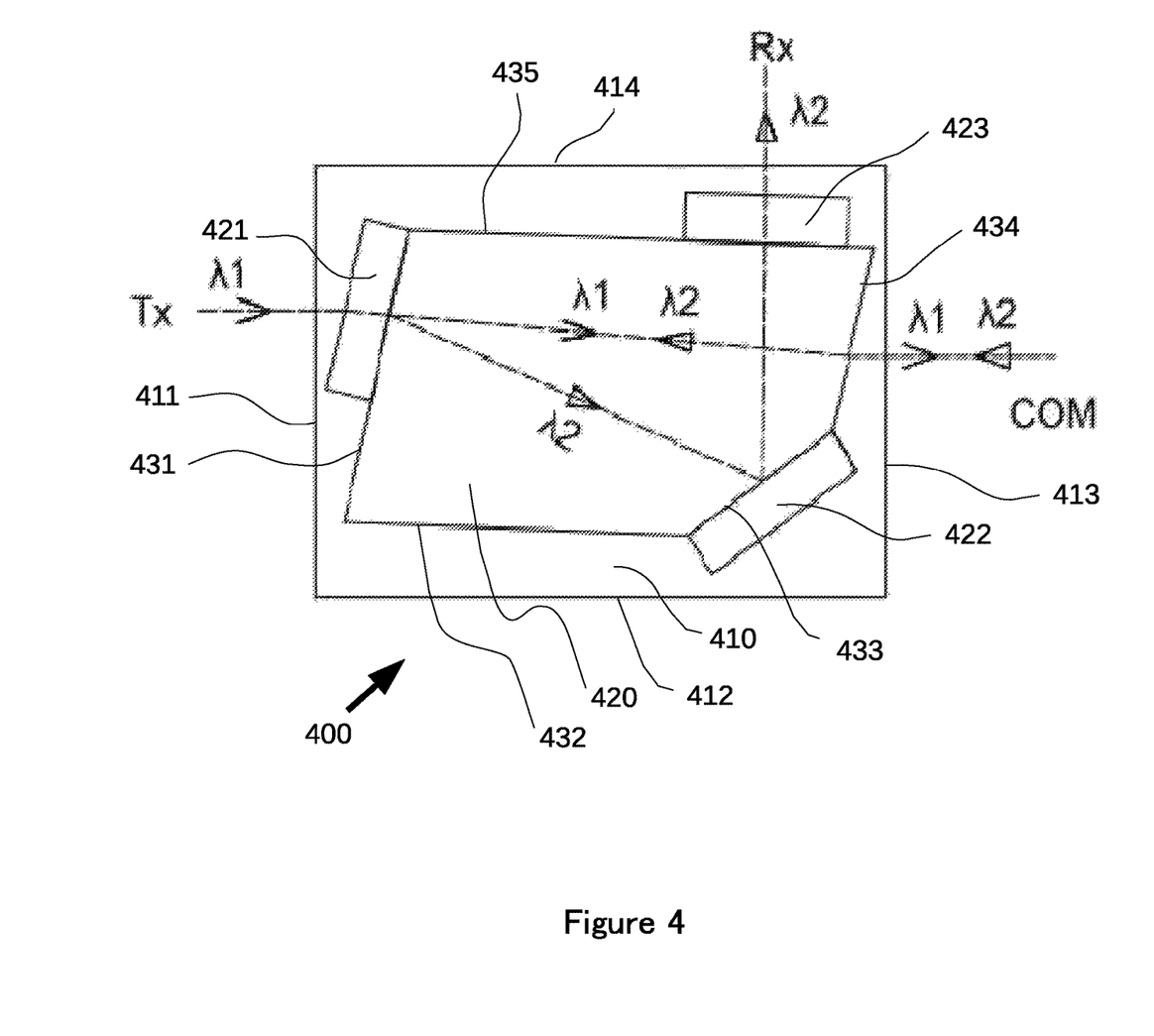
FIG. 4 is a demonstrative illustration of top view of the micro-optics module for WDM application as being demonstratively illustrated in FIG. 3.

Tx filter 321, Rx filter 323, and reflective mirror 322 work together to ensure that a first optical signal of a first wavelength entering Tx filter 321 may propagate directly through and exit glass body 320, and a second optical signal of a second wavelength entering one of the side surfaces into glass body 320 may reach Tx filter 321 and get reflected at Tx filter 321 to propagate toward reflective mirror 322, get reflected at reflective mirror 322 to propagate toward Rx filter 323, and subsequently pass through Rx filter 323 to exit glass body 320, details of which are described below in conjunction with the description of FIG. 4.

FIG. 4 is a demonstrative illustration of a top view of the micro-optics module 300 illustrated in FIG. 3, according to one embodiment of present invention. As being described above, micro-optics module 300, referenced here in FIG. 4 as micro-optics module 400, may include a glass body 420 sitting on top of a substrate 410. Glass body 420 may have or possess a pentagon shape to include five side surfaces. For example, glass body 420 may include an upper side surface 435, a left side surface 431 and a right side surface 434 that are both adjacent to the upper side surface 435, a lower side surface 432 next to the left side surface 431, and a 5th side surface 433 next to and between the lower side surface 432 and the right side surface 434. Hereinafter, the 5th side surface 433 may be referenced to, from time to time, as a slant side surface.

As used herein, the terms "left", "right", "upper", and "lower" are generally used relative to the orientation of the drawings being illustrated, and these references may change depending on different orientation of the referred drawings. Moreover, even though some side surfaces, such as the left side surface 431 and the right side surface 434, may be illustrated in FIG. 4 in a slant fashion as they truly are in some embodiment, they are not referred to herein as slant side surfaces solely for the sake of distinguishing them from the 5th side surface which may be referred to as a slant side surface. In addition, throughout this description, terms like "side surface" and "sidewall" may be used to describe glass body 420 and substrate 410 respectively, solely for the purpose of distinction between the two, even though both terms may essentially mean the same "side surface" or "sidewall" and thus may be used interchangeably.

Micro-optics module 400 may also include a Tx filter 421 attached to the left side surface 431, a Rx filter 423 attached to the upper side surface 435, and a reflective mirror 422 attached to the 5th (or slant) side surface 433 of glass body 420. Glass body 420 of module 400, together with Tx filter 421, Rx filter 423, and reflective mirror 422, is adapted to enable multiplexing and/or de-multiplexing of optical signals of at least two different wavelengths.

For example, upon incident at the left side surface 431 via Tx filter 421, a first optical signal of a first wavelength Ad may propagate inside glass body 420 toward and subsequently exit glass body 420 at the right side surface 434. Tx filter 421 may be coated with an AR coating (or film) at an input surface facing the in-coming first optical signal and, at the other surface facing the left side surface 431, may have a WDM filtering coating (or film) that is specifically designed to allow optical signals of a particular wavelength, such as wavelength λ1, pass through while rejecting or reflecting optical signals of other wavelengths other than wavelength λ1. It is further noted here that embodiment of present invention is not limited in this respect. WDM filtering coating (or film) of Tx filter 421 may be applied to have optical signals of a first set of, meaning one or more, wavelengths pass through while reflecting optical signals of a second set, meaning one or more, of wavelengths that are different from the first set of wavelengths.

Further for example, upon incident at the right side surface 434, a second optical signal of a second wavelength λ2 may propagate toward the left side surface 431. The right side surface 434 may be coated with an AR coating (or film) as well to enhance the launch of the second optical signal into glass body 420. The second wavelength λ2 is different from the first wavelength λ1, and the second optical signal gets reflected by Tx filter 421 at the left side surface 431 to propagate toward the 5th (slant) side surface. The second optical signal then gets reflected at the 5th (slant) side surface by reflective mirror 422 to propagate toward the upper side surface 435, and subsequently exit glass body 420 at the upper side surface 435 via Rx filter 423.

In one embodiment, Rx filter 423 may also be coated with an AR coating (or film) at an outer surface facing, for example, an optical receiving unit and, at the surface facing or next to the upper side surface 435, may have a WDM filtering coating (or film) that is specifically applied or designed to allow optical signals of a particular wavelength, such as wavelength λ2, pass through while rejecting or reflecting optical signals of other wavelengths other than wavelength λ2.

In one embodiment, the first and second wavelengths λ1 and λ2 may be separated no more than 14 nm. For example, the first wavelength may be 1295.56 nm (or 1309.14 nm) and the second wavelength may correspondingly be 1309.14 nm (or 1295.56 nm), separated from the first wavelength by 13.58 nm. In another embodiment, the first and second wavelengths may be separated larger than 14 nm but no more than 60 nm. For example, the first wavelength may be 1270.00 nm (or 1330.00 nm) and the second wavelength may correspondingly be 1330.00 nm (or 1270.00 nm), separated from the first wavelength by about 60 nm. According to one embodiment, module 400 may have an overall optical insertion loss of less than 0.5 dB over a 2.1 nm bandwidth centered around a wavelength of 1295.56 nm or 1309.14 nm. According to another embodiment, module 400 may have an overall optical insertion loss of less than 0.5 dB over a 13.0 nm bandwidth centered around a wavelength of 1270.00 nm or 1330.00 nm.

In one embodiment, the AR coating of Tx filter 421 and Rx filter 423 may have a reflectivity of less than 0.25% over a wavelength range from about 1260 nm to about 1360 nm. In another embodiment, the reflective mirror includes a first surface with a high reflective coating having a reflectivity larger than 99.80% over a wavelength range from about 1260 nm to about 1360 nm, and includes a second surface in a matte condition. The matte condition may be made for easing the handling of module 400 during assembling.

As being demonstratively illustrated in FIG. 4, glass body 420 is attached to a substrate 410. In one embodiment, substrate 410 has a rectangular shape and, when viewed from the top thereof, substrate 410 may include a left sidewall 411, a lower sidewall 412, a right sidewall 413, and an upper sidewall 414 which, together, form a perimeter of substrate 410. The perimeter of substrate 410 may encompass glass body 420. In other words, no portion of glass body 420 my extrude the perimeter of substrate 410 from a top view standpoint, which facilitates the handling of module 400 in field deployment.

Figure 5:
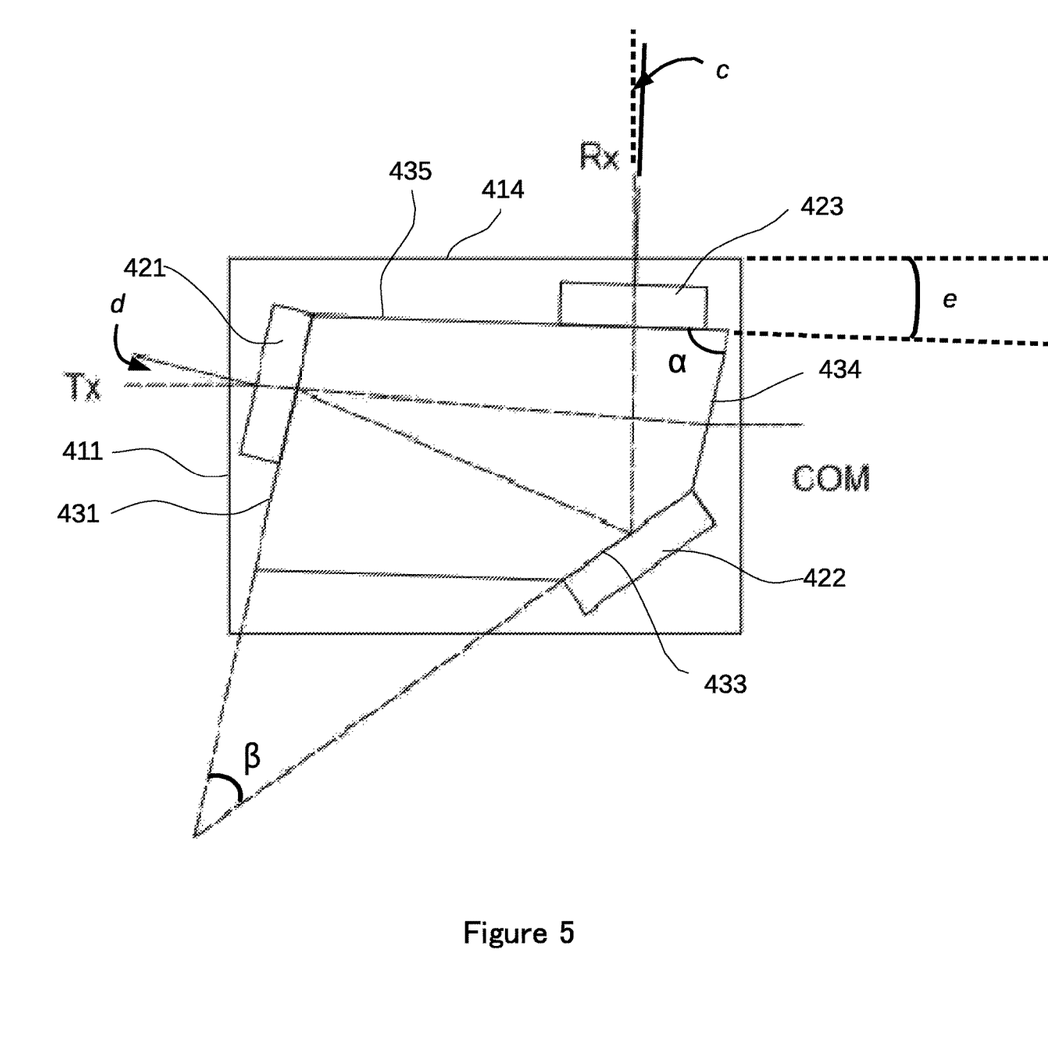
FIG. 5 is a demonstrative illustration of geometric relationship among and between side surfaces and sidewalls of the micro-optics module according to one embodiment of present invention.

FIG. 5 is a demonstrative illustration of geometric relationship among and between several side surfaces and sidewalls of glass body 420 and substrate 410 of micro-optics module 400 that is illustrated in FIG. 4. In one embodiment, the upper sidewall 414 of substrate 410 forms an angle e, of at least 2 degrees but no more than 13.5 degrees, with the upper side surface 435 of glass body 420. In other words, the normal to upper sidewall 414 and the normal to upper side surface 435 forms an angle c that, in theory c equals e, is between 2 to 13.5 degrees and preferably around 2 degrees.

It is to be noted here that the angle c between the normal of upper sidewall 414 and upper side surface 435 does not exist in any currently known WDM devices, for example in WDM filter 200 (see FIG. 2) which has different structure from module 400 to start with, and this introduction of angle c has advantageously reduced noise of the optical receiving system that normally has a photo-detector placed in alignment with the normal of upper sidewall 414 of substrate 410. By introduction of this angle c, which may be considered as an "offset" angle, back-reflection of light from possibly surfaces, such as that of WDM filter 423, into the photo-detector is dramatically reduced. Embodiment of present invention enabled this creation or introduction of "offset" angle by the use of glass body 420, which generally has a refractive index that is larger than surrounding air. This difference in refractive index creates a "bending" of light, or optical signal, when exiting from glass body 420 and Rx filter 423 into air.

According to another embodiment, the left sidewall 411 of substrate 410 forms advantageously an angle d of at least 2 but no more than 13.5 degrees with the left side surface 431 of glass body 420, similar to that of angle c. The introduction of angle d, preferably around 13.5 degrees, reduces possible back-reflection of light, or optical signal, from the surfaces such as that of WDM filter 421, and dramatically improves the stability of transmitter that is normally placed in alignment with the normal of left sidewall of substrate 410.

According to another embodiment, the left side surface 431 and the 5th (slant) side surface 433 of glass body 420 form an angle β that equals to (45−e) degrees. According to yet another embodiment, the left side surface 431 and the right side surface 434 of the glass body 420 may be made parallel to each other, and in this case the right side surface 434 and the upper side surface 435 of glass body 420 form an angle α that equals to (90−d+e).

In one embodiment, preferably, the normal of upper sidewall 414 and upper side surface 435 form an angle c of 2 degrees; the normal of left sidewall 411 and left side surface 431 form an angle d of 13.5 degrees; the left side surface 431 and the 5th (slant) side surface 433 form an angle β that equals (45−e) of 43 degrees; and the upper side surface 435 and the right side surface 434 form an angle α that equals (90−d+e) of 78.5 degrees.

By the introduction of glass body 420 in connection with strategically arranging its side surface orientation relative to that of the sidewalls of substrate 410, on top of which glass body 420 sits, embodiment of present invention enables a micro-optics module 400 that allows an effective input aperture that is equal to or larger than 0.6=, and a tolerance of optical input angle deviation between +/−0.5 degree.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the spirit of the invention.

What is claimed is:

1. A micro-optics module for WDM (wavelength division multiplexing) application, the module comprising:
   a glass body of pentagon shape, when viewed from a top thereof, having five side surfaces including an upper side surface, a left side and a right side surface next to the upper side surface, a lower side surface next to the left side surface, and a 5th side surface next to and between the lower side surface and the right side surface,
   wherein the glass body is adapted to, upon incident of a first optical signal at the left side surface, cause the first optical signal to propagate directly toward and exit the glass body subsequently at the right side surface and, upon incident of a second optical signal at the right side surface, cause the second optical signal to propagate toward the left side surface; to reflect back at the left side surface to propagate toward the 5th side surface; to reflect back at the 5th side surface to propagate toward the upper side surface; and to exit the glass body subsequently at the upper side surface;
   a transmit (Tx) filter being attached to the left side surface of the glass body, wherein the Tx filter enables the first optical signal of a first wavelength $\lambda 1$ to pass through the Tx filter and enter the glass body; and
   an anti-reflective (AR) coating on the right side surface of the glass body, wherein the AR coating enables the second optical signal to enter the glass body and propagate toward the left side surface, and the Tx filter causes the second optical signal of a second wavelength $\lambda 2$ to reflect back at the left side surface to propagate toward the 5th side surface, wherein $\lambda 1$ and $\lambda 2$ are separated no more than 60 nm.

2. The module of claim 1, further comprising a reflective mirror being attached to the 5th side surface of the glass body that causes the second optical signal to reflect back at the 5th side surface to propagate toward the upper side surface; and further comprising a receive (Rx) filter being attached to the upper side surface of the glass body that enables the second optical signal of the second wavelength $\lambda 2$ to pass through and exit the glass body.

3. The module of claim 1, further comprising a substrate thereupon the glass body situates and is attached, wherein the substrate includes sidewalls forming a perimeter that, when viewed from a top thereof and from the top of the glass body, encompasses the glass body; and the perimeter includes an upper sidewall that forms an angle e of at least 2 degrees with the upper side surface of the glass body.

4. The module of claim 3, wherein the perimeter of the substrate includes a left sidewall that forms an angle d of no more than 13.5 degrees with the left side surface of the glass body.

5. The module of claim 3, wherein the left side surface and the 5th side surface of the glass body form an angle β that equals to (45−e) degrees.

6. The module of claim 4, wherein the left side surface and the right side surface of the glass body are parallel to each other, and wherein the right side surface and the upper side surface of the glass body form an angle α that equals to (90−d+e).

7. The module of claim 2, wherein the glass body has a thickness of about 0.95 mm, and wherein the Tx filter, the Rx filter, and the reflective mirror have a height of about 0.95 mm, measured in a direction of thickness of the glass body, that is substantially same as the thickness of the glass body.

8. The module of claim 7, wherein the Tx filter, the Rx filter, and the reflective mirror have a length that is substantially same as the height thereof about 0.95 mm, measured in a direction perpendicular to the height along surfaces of the glass body to which the Tx filter, the Rx filter and the reflective mirror are attached respectively.

9. The module of claim 2, wherein a center wavelength of the Tx filter is one of around 1309.14 nm and around 1295.56 nm, and a center wavelength of the Rx filter is another one of around 1309.14 nm and around 1295.56 nm that is different from that of the Tx filter, and the module has an insertion loss of no more than 0.5 dB in a bandwidth of around 2.1 nm centered around their respective center wavelengths.

10. The module of claim 2, wherein a center wavelength of the Tx filter is one of around 1330.00 nm and around 1270.00 nm, and a center wavelength of the Rx filter is another one of around 1330.00 nm and around 1270.00 nm that is different from that of the Tx filter, and the module has an insertion loss of no more than 0.5 dB in a bandwidth of around 13.0 nm centered around their respective center wavelengths.

11. The module of claim 2, wherein the Tx filter and Rx filter have a first and a second surfaces respectively, and include an AR coating on the first surfaces and a WDM filtering coating on the second surfaces, and wherein the AR coating has a reflectivity of less than 0.25% over a wavelength ranging from about 1260 nm to about 1360 nm.

12. The module of claim 2, wherein the reflective mirror includes a first surface with a high reflective coating having a reflectivity larger than 99.80% over a wavelength ranging from about 1260 nm to about 1360 nm, and includes a second surface of matte condition.

13. A micro-optics module comprising:
a glass body of pentagon shape having five side surfaces including an upper side surface, a left side and a right side surface next to the upper side surface, a lower side surface next to the left side surface, and a 5th side surface next to and between the lower side surface and the right side surface;
a transmit (Tx) filter attached to the left side surface of the glass body, wherein the Tx filter enables a first optical signal to pass through the Tx filter and enter the glass body;
a reflective mirror attached to the 5th side surface of the glass body that causes a second optical signal coming from the left side surface to reflect back and propagate toward the upper side surface; and
a receive (Rx) filter attached to the upper side surface of the glass body that enables the second optical signal pass through and exit the glass body.

14. The module of claim 13, wherein the glass body is adapted to, upon incident of the first optical signal of a first wavelength λ1 at the left side surface, cause the first optical signal to propagate toward and exit the glass body subsequently at the right side surface and, upon incident of the second optical signal of a second wavelength λ2 at the right side surface, cause the second optical signal to propagate toward the left side surface; to reflect back at the left side surface to propagate toward the 5th side surface; to reflect back at the 5th side surface to propagate toward the upper side surface; and to exit the glass body subsequently at the upper side surface, wherein the first and second wavelengths λ1 and λ2 are different.

15. The module of claim 13, further comprising a substrate thereupon the glass body is attached, wherein the substrate includes a perimeter that encompasses the glass body; and the perimeter includes an upper sidewall that forms an angle e of at least 2 degrees with the upper side surface of the glass body.

16. A micro-optics module for WDM (wavelength division multiplexing) application, the module comprising:
a glass body of pentagon shape having five side surfaces including an upper side surface, a left side and a right side surface next to the upper side surface, a lower side surface next to the left side surface, and a 5th side surface next to and between the lower side surface and the right side surface; and
a substrate thereupon the glass body situates and is attached, wherein the substrate includes a sidewall perimeter that, when viewed from a top thereof, encompasses the glass body,
wherein the substrate has a rectangular shape including at least an upper sidewall and a left sidewall, wherein the upper sidewall of the substrate forms an angle e of at least 2 degrees with the upper side surface of the glass body, and the left sidewall of the substrate forms an angle d of no more than 13.5 degrees with the left side surface of the glass body.

17. The module of claim 16, wherein the left side surface and the 5th side surface of the glass body form an angle β that equals to (45−e) degrees, and the left side surface and the right side surface of the glass body are parallel to each other, and the right side surface and the upper side surface of the glass body form an angle α that equals to (90−d+e).

* * * * *